Figure 1:
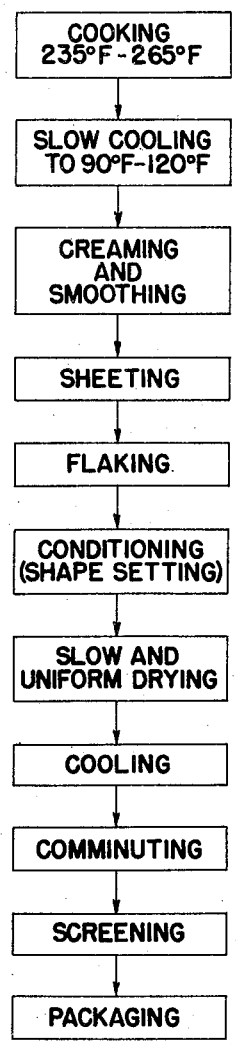

July 29, 1958　　　H. E. PECK ET AL　　　2,845,352
FUDGE-MAKING PROCESS

Filed Dec. 5, 1956

INVENTOR.
HENRY E. PECK,
JES V. SIDENIUS
BY AND C. RUSSELL DERBY

ATTORNEY

2,845,352

FUDGE-MAKING PROCESS

Henry E. Peck, Fairport, and Jes V. Sidenius and Claude Russell Derby, Little Falls, N. Y., assignors to Chr. Hansen's Laboratory, Inc., Little Falls, N. Y., a corporation of New York Application December 5, 1956, Serial No. 626,483

10 Claims. (Cl. 99—134)

This invention relates to an improved process for making a reconstitutable fudge and frosting.

The production of a fine fudge or fudge frosting is a difficult art. Because of this, there have been increasing sales of ready-mix fudge and frosting preparations, which enable the housewife to make in her own kitchen a high quality fudge or frosting simply by adding liquid to the mix, heating quickly, and cooling.

There are available processes for making such prepared mixes. All known processes are batch processes depending somewhat for their successful operation on the skill of the individual operator in charge. These known processes produce products whose grain or crystal size is scattered throughout the range of 1 to 200 microns. Small as this range is, the non-uniformity within the range is sufficient to impart a discernible grainy texture or gummy texture to the product, which frequently causes an undesirable consumer reaction. Furthermore, the methods used in the past have frequently produced products containing small overly-dried powdery particles which were difficult to rewet.

An object of the present invention is to provide a process for making a prepared fudge and frosting mix capable of being reconstituted extremely rapidly to produce a product having a substantially uniform grain size, smooth texture, and the desirable characteristics of a high quality fudge or fudge frosting. A related object of the invention is to provide such a process which may be operated as a semi-continuous or continuous process.

Another object of the invention is to provide a process for making a prepared fudge and frosting mix in which consistent good results are obtained so that less reliance is required on the skill of the operator in charge of the operation.

A related object of the invention is to provide a process for producing a prepared mix of the type described which is characterized by a more uniform moisture content than mixes previously available, wherein the moisture is more evenly distributed throughout the entire mix so that the mix is free of small overly-dried particles which are difficult to rewet.

According to the process of this invention, the ingredients for a soft candy body, such as a fudge or frosting, are cooked at an elevated temperature in the approximate range of 235° F. to about 265° F., and are then cooled and creamed. The cooling step is a slow step, in which the cooked batch is spread in a thin layer over a table, slab, drum or belt, which is maintained at a substantially constant temperature by the re-circulation of water at a constant temperature. The mass is then creamed and broken into discrete pieces, which are then formed into a thin sheet, that is allowed to fracture of its own weight into flakes roughly similar to potato chips. The flakes are then deposited into a deep bed on a foraminous support such as a metallic mesh conveyor belt, and are processed through a drying operation in which the conveyor carries the bed of flakes slowly through zones of increasing temperature in which heated air is passed upwardly through the foraminous conveyor belt and the bed of flakes.

This novel process has the primary advantage of reducing the moisture content of the flakes substantially uniformly, and of producing products of more uniform grain or crystal size. Because of this, the final product is free of small, overly-dry, powdery particles. For this reason, the average moisture content of the mass may be maintained at a uniform level, between 1% and 2% by weight. This facilitates rewetting and is an important advantage of the invention.

After drying, the flakes are cooled, ground or comminuted for reduction of size, and screened. The screened product is packaged and is distributed to the consumer. The product is characterized by high stability during shelf storage, that is, by long shelf-life.

Figure 2:
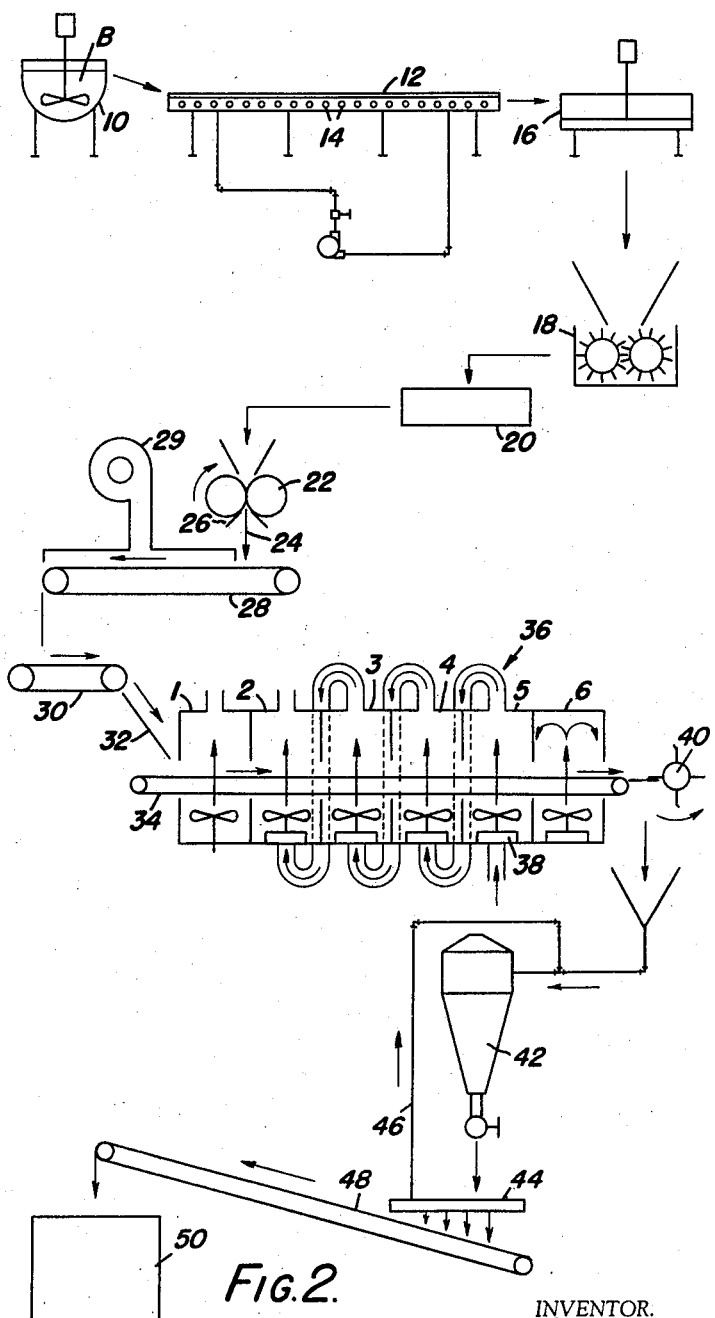

The invention may best be understood by further reference to the following detailed description of the process of this invention, with reference to the drawings, in which:

Fig. 1 is a summary, in diagrammatic block form, of the successive steps in the process of this invention; and Fig. 2 is a diagrammatic representation of the cooking, cooling, creaming, flaking, drying, disintegrating, screening, and packaging steps.

Fudge candy and frosting may vary considerably in its specific makeup, but generally the ingredients include milk, corn syrup (glucose), sugar, fat, and salt or other flavorant as desired. If chocolate flavoring is employed, or any other flavoring including a great amount of fat therein, the proportion of fat may be adjusted accordingly.

The proportions of the ingredients which may be employed to make a reconstitutable mix, according to this invention, are generally those described in U. S. Patents 1,983,568 and 2,106,762, issued to Robinson et al. Obviously, other proportions of ingredients may be employed in this invention in addition to those described in the two patents just mentioned.

The major portion of the ingredients are thoroughly mixed, and are cooked at a temperature in the range of about 235° F. to about 265° F., while undergoing slow agitation. The cooked mass is then poured on a cooling surface where it forms a thin layer, and is cooled slowly by the recirculation of coolant at a controlled temperature—preferably about 70° F. The cooling reduces the temperature of the cooked mass to the range of 90-120° F. A layer thickness greater than about one-half inch is undesirable because the lowermost stratum loses its heat rapidly and acts as an insulating barrier.

The cooled mass is then placed in a creamer, where it is subjected to the continued movement and kneading action of a rotor until the entire mass is creamed. The mass produced by the creaming operation is broken up by passing the creamed mass through meshing spiked rotors, which tear the mass apart. The disintegrated creamed mass is then transferred to a holding drum whose function is that of a surge hopper and metering device.

The cooked and creamed mass is then compressed through a pair of heavy rolls having a spacing between their opposed surfaces on the order of 0.005 to 0.015 inch. A continuous relatively thin sheet is thus formed. Curiously, the sheet seems to expand after passing through the rolls to a thickness roughly three to four times that of the roll spacing. The sheet fractures readily of its own weight into flakes which are quite similar in size to potato chips.

The flakes are deposited in a deep bed on a foraminous conveyor belt. The conveyor belt carries the bed of flakes, at a slow rate of speed, through a tunnel which is divided into several compartments. As the flakes enter the tunnel, they contain about 6% to about 10% moisture, In the first compartment of the tunnel, air at room temperature is blown upwardly through the conveyor belt and the bed of flakes, in order to dry the surface of the flakes to set their shape. In subsequent successive compartments in the tunnel, increasingly hot air is passed upwardly through the foraminous belt and the bed of flakes in order to remove moisture from the flakes at a slow, substantially uniform rate. Preferably, the heated air is distributed in counter-current flow to the direction of travel of the bed of flakes, so that the air at the highest temperature passes through the most remote drying compartment, with the cooler air, already moisture-laden, passing upwardly through the bed of flakes in the first drying compartment. In a final compartment in the drying tunnel, cool air may be circulated again through the bed of flakes in order to reduce its temperature and prepare the flakes for exposure to the atmosphere.

After drying and cooling, the flakes are passed out of the tunnel and are disintegrated, screened, and packaged. While the screening may be selective to produce a particular product having any desired size range, a 16 or 18 mesh screen has been found to produce particles of an optimum size for rewetting and reconstituting. To recapture any fine particles formed by the disintegrating step, a cyclone separator may be employed.

Among the many advantageous features of this process, particular mention should be made of the even cooling which is employed directly following the cooking step. When the thickness of the layer on the cooling table is kept at approximately ½″ or less, with the water temperature maintained at 60°–70° F., the tendency of the lowermost stratum of the cooked mass to act as an insulating barrier is minimized. The even cooling at this point promotes the ultimate production of a product characterized by the fineness of its grain size, and the uniformity of its grain size.

The novel drying technique applied according to this invention removes moisture from the product at a substantially uniform rate so that the final product obtained can be truthfully described as substantially homogeneous. The moisture content of the mix falls in the range of 1% to 2% by weight, and is substantially uniform throughout the mix. This uniform moisture content enhances the texture of the product and also facilitates rewetting. The product is entirely free of the small, completely dry powdery particles and dry dust characteristic of products prepared by other processes.

For a more complete understanding of the invention, a specific demonstration of the invention will be described.

*Example 1*

The following ingredients were employed:

| Ingredients: | Parts by weight |
|---|---|
| Unsweetened evaporated milk | 2 |
| Corn syrup, 43° Baumé | ½ |
| Granulated sugar | 9 |
| Butter | ½ |
| Salt and flavorants to taste. | |

These ingredients were mixed together in a kettle 10 as a batch B having a total weight of about 160 lbs. The ingredients were cooked at 250° F., with stirring, and after cooking, the batch was poured on a cooling table 12. The available table surface was sufficiently large so that the batch formed a layer approximately ½″ thick. The batch was cooled evenly to 110° F. by the recirculation as well water at 63° F. through cooling coils 14 located directly under the surface of the table.

After the batch temperature had dropped to 110° F. on the cooling table, it was removed and passed through a creamer 16. In the creamer, the batch was subjected to a plowing action by a continuously moving rotor. The creamed batch B was passed through a disintegrator 18 having meshing spiked rotors, which tore the mass and produced lump sizes to a maximum of one-half inch. The creamed batch was then passed into a holding drum 20, which functioned as a metering device and surge hopper.

The creamed batch was passed from the holding drum 20 between a pair of rolls 22 having opposed surfaces set 0.008″ apart. The mild compression applied to the batch by passage through these rolls formed the batch into a rough, flaky sheet 24. The thickness of the sheet 24 was approximately three to four times the thickness of the roll spacing. A sheet thickness on the order of 0.030″ to 0.040″ was usual. At this point, the batch had a moisture content on the order of 8% to 8.5% by weight. Any flaky material adhering to the surface of the rolls was removed by doctor knives 26, and was dropped with the sheet 24 to a travelling conveyor belt 28 disposed directly beneath the rolls. As the sheet 24 dropped downwardly to the conveyor 28, it tended to fracture and flake of its own weight. A fan 29 was disposed over the conveyor belt to cause circulation of air around the sheet and to minimize agglomeration of free flakes.

From the conveyor belt 28, the sheet and flakes were allowed to drop onto a second travelling conveyor belt 30, which caused the remaining portions of the sheet to fracture into small flakes having the approximate size of potato chips. The second conveyor belt deposited the flakes onto a chute 32 leading to a foraminous conveyor belt 34 where the flakes were deposited as a bed several inches in thickness. The foraminous conveyor was of steel mesh.

The foraminous conveyor belt 34 carried the bed of flakes through a tunnel 36 having several separated compartments. In compartment 1 of the tunnel, air at room temperature was passed upwardly through the bed of flakes. The purpose was to remove moisture from the surface of the flakes so as to harden their exterior surface. This set the shape of the flakes and the bed and gave them the necessary structural strength to withstand subsequent drying operations without substantial crumbling or matting.

In the next four successive compartments 2, 3, 4, and 5, further moisture removal took place. In compartment 5, heated air from an air heater 38 was forced by a fan upwardly through the foraminous conveyor belt and the bed of flakes. The discharge air from compartment 5 was fed through compartment 4, and the discharge from 4 was fed through 3, and so on, so that a counter-current air flow was maintained in the active drier compartments 2, 3, 4 and 5. In order to obtain the drying temperatures desired, additional radiant heaters were used as necessary in compartments 3, 4, and 5, to reheat the circulating air. This was necessary to maintain the bed and dryer at the desired temperature.

In compartment 2, a drying temperature of approximately 125° F. was employed. In compartments 3, 4, and 5, drying temperatures of 140° F. to 200° F. were maintained.

In compartment 6, the hot flakes were cooled by the passage therethrough of a current of input air cooled sufficiently that the flakes discharged from the tunnel had a temperature of approximately 80° F. to 100° F.

The foraminous conveyor 34 moved the bed of flakes at a constant speed through the tunnel 36, and the total drying time, from one end of the tunnel to the other, was approximately 110 minutes. The gradual, uniform drying action obtained in this manner resulted in an even distribution of moisture throughout the product. In other demonstrations of the process, drying periods as long as 180 minutes were employed.

The dried and cooled product was then disintegrated in a chopping apparatus 40, and was passed through a cyclone separator 42 onto a screen separator 44. Oversize material was separated out, ground in a mill (not shown), and recycled through the cyclone via a line 46. A conveyor 48 carried the screened product into a storage device 50.

The product was readily differentiated from dry-mix products because it may be reconstituted into a fudge product having crystals of substantially uniform shape and size, with the size being confined in a certain range. This uniformity of size and shape is essential in a good fudge product. Conventional mix preparations of this general type are frequently uncooked and use a powdered sugar product produced by grinding. The sugar crystals in the ultimate product thus produced are not of uniform size or shape, and are not confined within the specified, limited size range which is essential for a good fudge product. The difference is such that it can be observed by the average consumer, and is outstanding to one skilled in the art.

Example II

In a second demonstration of the invention, a slightly different batch formulation was employed as follows:

Ingredients:                              Parts by weight
  Granulated sugar_____ 10
  Corn syrup, 43° Baumé_____ 0.75
  Cocoa butter or vegetable fat_____ 0.5
  Non-fat dry milk solids_____ 0.25
  Salt, chocolate and flavorants to taste.

This was made up as a batch containing approximately 160 lbs., as before, and was processed in precisely the same way. An equally fine product was obtained upon reconstitution of the dried product.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:

1. The process of making a reconstitutable, stable, particulate candy product which rewets rapidly and which may be converted to a smooth-textured, relatively uniform, fine-grained fudge product upon mixing with water, heating, and cooling, comprising compressing a mass of a cooked, creamed, fudge candy to form a ribbon-like sheet, reducing said sheet to discrete flakes, progressively reducing the moisture content of said flakes, and comminuting said dried flakes to obtain the desired dry, stable, particulate product.

2. The continuous process of making a reconstitutable, stable, particulate candy product which rewets rapidly and which may be converted to a smooth-textured, relatively uniform, fine-grained fudge product upon mixing with water, heating, and cooling, comprising compressing a mass of a cooked, creamed, fudge candy to form a ribbon-like sheet, allowing said sheet to drop endwise to permit it to break of its own weight into discrete flakes, accumulating said flakes in a relatively thick bed, passing a current of drying air upwardly through said bed, thereby reducing the moisture content of said flakes, and comminuting said dry flakes to obtain the desired stable, particulate product.

3. The process of making a reconstitutable, fudge candy product comprising compressing a mass of cooked, creamed, fudge candy to form a ribbon-like sheet and then permitting said sheet to expand in thickness freely, dropping said sheet endwise to permit it to break of its own weight into discrete flakes, depositing said flakes in a relatively thick bed, then passing a current of drying air through said bed of flakes, thereby reducing the moisture content of said flakes, and cooling and comminuting said flakes to obtain a stable, particulate product.

4. The process of making a reconstitutable, fudge candy product comprising compressing a substantially homogeneous mass of cooked, creamed, fudge candy between pressure-applying members to form a ribbon-like sheet, dropping said sheet endwise to permit it to break of its own weight, then again dropping said broken sheet to form discrete, thin flakes, depositing said flakes as a bed on a foraminous support, passing a current of drying air through said bed and foraminous support at a controlled temperature, thereby reducing the moisture content of said flakes, and comminuting said flakes to obtain a stable, particulate product.

5. The process of controlling the moisture content of a reconstitutable, fudge candy product comprising converting a mass of cooked, creamed, fudge candy to discrete, self-sustaining thin flakes, depositing said flakes in a relatively thick bed on a foraminous support, passing a current of air upwardly through said foraminous support and bed of flakes thereby first hardening the outer surface of said flakes and rigidifying the flakes into a set shape then reducing the moisture content of said flakes to a desired level, and cooling and comminuting said flakes to obtain a stable, particulate product.

6. The process of making a reconstitutable, stable, particulate candy product which rewets rapidly and which may be converted to a smooth-textured, relatively uniform, fine-grained fudge product upon mixing with water, heating, and cooling, comprising compressing a cooked, creamed mass of fudge candy between pressure-applying members to form a ribbon-like sheet, allowing said sheet to expand in thickness immediately after compressing it, allowing said sheet to fall by its own weight to break it into discrete flakes, depositing said flakes in a relatively thick bed on a foraminous support, passing a current of air upwardly through said foraminous support and bed of flakes thereby setting the shape of the flakes, then passing a current of air at an elevated temperature upwardly through said foraminous support and bed of flakes, thereby reducing the moisture content of said flakes, and then cooling and comminuting said flakes to obtain a stable, particulate product.

7. The process of making a reconstitutable particulate candy product which comprises cooking together the ingredients to make a fudge candy, cooling and creaming the cooked batch to form a lumpy mass, disintegrating said lumps, compressing said mass to form a ribbon-like sheet, allowing said sheet to fall and break under its own weight into discrete flakes, gradually reducing the moisture content of the flakes uniformly to 1% to 2% by weight, and comminuting said flakes to form a dry, particulate product characterized by its ability to be reconstituted into a smooth-textured, relatively uniform, fine-grained fudge product upon mixing with water, heating and cooling.

8. The process of controlling the moisture content of a reconstitutable, fudge candy product comprising compressing a mass of cooked, creamed, fudge mix between pressure applying members to form a ribbon-like form characterized by thinness in at least one direction, reducing the moisture content of said mix while in a form still characterized by thinness in at least one direction, and comminuting the dried mix to obtain a stable, dried, particulate product.

9. The process of making a reconstitutable, particulate sugar product capable of producing a relatively uniform, fine-grained fudge article on mixing and heating with water, comprising cooking together the ingredients to make a cooked fudge-like mass, cooling the cooked mass as a thin layer on a surface maintained at a substantially uniform temperature, creaming the cooled mass, compressing the homogeneous mass to form a ribbon-like sheet, allowing said sheet to fall endwise to break under its own weight into discrete flakes, removing a substantial portion of the moisture content of said flakes by a progressive drying operation producing uniformly dried flakes, and comminuting said dried flakes to obtain the desired particulate product.

10. The process of making a reconstitutable, particulate sugar product capable of producing a relatively uniform, fine-grained fudge article on mixing and heating with water, comprising cooking together the ingredients to make a fudge-like product, cooling the cooked ingredients in a thin layer on a cooling surface maintained at a substantially constant uniform temperature, creaming the cooled mass, compressing said mass between pressure-applying members to form a ribbon-like sheet, allowing said sheet to expand in thickness immediately after compressing it, and dropping said sheet endwise under its own weight to break to form discrete, thin flakes, then again dropping said broken sheet endwise under its own weight, then depositing said flakes in a relatively thick bed, passing a current of drying air through said bed at a controlled temperature, thereby gradually and uniformly reducing the moisture content of said bed of flakes, and thereafter cooling and comminuting said flakes to obtain a particulate product.

References Cited in the file of this patent

UNITED STATES PATENTS

| | | |
|---|---|---|
| 2,373,919 | Schweiger | Apr. 17, 1945 |
| 2,399,195 | Bodenheim | Apr. 30, 1946 |
| 2,487,931 | Lataner | Nov. 15, 1949 |